(12) United States Patent
Harrebek et al.

(10) Patent No.: US 11,177,983 B2
(45) Date of Patent: Nov. 16, 2021

(54) CROSS LINK INTERFERENCE MEASUREMENT CONDITIONS REPORTING

(71) Applicant: Nokia Technologies Oy, Espoo (FI)

(72) Inventors: Johannes Harrebek, Aalborg (DK); Lei Du, Beijing (CN); Lars Dalsgaard, Oulu (FI); Klaus Ingemann Pedersen, Aalborg (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 83 days.

(21) Appl. No.: 16/874,717

(22) Filed: May 15, 2020

(65) Prior Publication Data
US 2021/0006438 A1 Jan. 7, 2021

(30) Foreign Application Priority Data

Jul. 3, 2019 (WO) ................ PCT/CN2019/094618

(51) Int. Cl.
| | | |
|---|---|---|
| H04L 25/02 | (2006.01) | |
| H04B 17/336 | (2015.01) | |
| H04L 5/00 | (2006.01) | |
| H04W 8/24 | (2009.01) | |
| H04W 24/10 | (2009.01) | |

(52) U.S. Cl.
CPC ....... *H04L 25/0226* (2013.01); *H04B 17/336* (2015.01); *H04L 5/0051* (2013.01); *H04W 8/24* (2013.01); *H04W 24/10* (2013.01)

(58) Field of Classification Search
CPC ... H04L 25/0226; H04L 5/0051; H04W 24/10
See application file for complete search history.

(56) References Cited

U.S. PATENT DOCUMENTS

| | | | |
|---|---|---|---|
| 2018/0323916 A1 | 11/2018 | Yang et al. | |
| 2019/0260486 A1* | 8/2019 | Kang | ................ H04W 72/0446 |

(Continued)

FOREIGN PATENT DOCUMENTS

| | | |
|---|---|---|
| CN | 109088683 A | 12/2018 |
| WO | 2018/126792 A1 | 7/2018 |

(Continued)

OTHER PUBLICATIONS

Extended European Search Report received for corresponding European Patent Application No. 20174281.4, dated Nov. 9, 2020, 13 pages.

(Continued)

*Primary Examiner* — Zhiren Qin
(74) *Attorney, Agent, or Firm* — Nokia Technologies Oy

(57) ABSTRACT

Systems, methods, apparatuses, and computer program products for cross link interference (CLI) sounding reference signal (SRS)-reference signal received power (RSRP) measurement conditions reporting are provided. One method may include providing, to a serving network node, capability information indicating at least UE's capability to search for SRS timing, receiving SRS configuration in a measurement request from the serving network node, performing, by the UE, at least one SRS RSRP measurement as specified in the SRS configuration, and reporting, to the serving network node, CLI SRS RSRP measurement results.

17 Claims, 8 Drawing Sheets

(56) References Cited

U.S. PATENT DOCUMENTS

2020/0169435 A1* 5/2020 Kang .................. H04L 27/2607
2021/0084655 A1* 3/2021 Estevez ............... H04B 7/0617

FOREIGN PATENT DOCUMENTS

WO        2019/031816 A1     2/2019
WO        WO2020252339     * 12/2020 ............... H04L 5/00

OTHER PUBLICATIONS

"On UE-to-UE Cross-link Interference Measurements and Reporting", 3GPP TSG RAN WG1 #96, R1-1903219, Agenda : 7.2.5.1, CEWiT, Feb. 25-Mar. 1, 2019, 5 pages.

"UE Capability for CU Measurements", 3GPP TSG-RAN WG2 #106, R2-1907400, Agenda : 11.15, Huawei, May 13-17, 2019, 3 pages.

"UE-to-UE Measurement for Cross-link Interference Mitigation", 3GPPTSG RAN WG1 Meeting #91, R1-1719835, Agenda : 7.8, Huawei, Nov. 27-Dec. 1, 2017, 12 pages.

"LS on UE-UE CLI Measurement/reporting and Network Coordination Mechanism for CLI", 3GPP TSG RAN WG4 Meeting #90bis, R4-1902802, Apr. 8-12, 2019, 4 pages.

"UE CLI Measurement Configuration, reporting, and NW Signaling", 3GPP TSG-RAN2#107bis, R2-1912408, Agenda : 6.15, Nokia, Oct. 14-18, 2019, 10 pages.

"Revised WID on Cross Link Interference (CLI) handling and Remote Interference Management (RIM) for NR", 3GPP TSG RAN Meeting #82, RP-182864, Agenda : 9.4.2, LG Electronics, Dec. 10-13, 2018, 5 pages.

"LS on UE-UE CLI measurement/reporting and Network coordination mechanism for CLI", 3GPP TSG RAN WG1 Meeting #96, R1-1903677, Feb. 25-Mar. 1, 2019, 4 pages.

"3rd Generation Partnership Project; Technical Specification Group Radio Access Network; NR; Requirements for support of radio resource management (Release 15)", 3GPP TS 38.133, V15.5.0, Mar. 2019, pp. 1-893.

"Details of UE CLI measurements", 3GPP TSG-RAN1#96, R1-1902672, Agenda : 7.2.5.1, Nokia, Feb. 25-Mar. 1, 2019, 9 pages.

"UE CLI measurement configuration and reporting", 3GPP TSG-RAN2#106, R2-1906637, Agenda : 11.15, Nokia, 5 pages.

U.S. Appl. No. 62/805,475, "Triggering of UE CLI Measurement Reporting", filed on Feb. 14, 2019, 21 pages.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project;Technical Specification Group Radio Access Network;NR; User Equipment (UE) Yadio transmission and reception;Part 1: Range 1 Standalone (Release 15)", 3GPP TS 38.101-1, V15.5.0, Mar. 2019, pp. 1-239.

International Search Report and Written Opinion received for corresponding Patent Cooperation Treaty Application No. PCT/CN2019/094618, dated Apr. 1, 2020, 9 pages.

"Initial discussion on RRM requirements for CLI measurement", 3GPP TSG-RAN WG4 Meeting #90bis, R4-1903801, Agenda : 8.2.3, Huawei, Apr. 8-12, 2019, pp. 1-5.

"Considerations on SRS-RSRP measurements for CLI", 3GPP TSG RAN WG4 Meeting #90bis, R4-1904303, Agenda 8.2.3, Ericsson, Apr. 8-12, 2019, pp. 1-4.

* cited by examiner

CROSS LINK INTERFERENCE MEASUREMENT CONDITIONS REPORTING

RELATED APPLICATION

This application claims priority from PCT Application No.: PCT/CN2019/094618 filed on Jul. 3, 2019, which is hereby incorporated in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for cross link interference (CLI) measurement reporting.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and/or may be named NG-eNB when built on E-UTRA radio.

SUMMARY

One embodiment is directed to a method that may include providing, by a user equipment to a serving network node, capability information indicating at least the user equipment's capability to search for sounding reference signal (SRS) timing, receiving sounding reference signal (SRS) configuration in a measurement request from the serving network node, performing, by the user equipment, at least one sounding reference signal (SRS) reference signal received power (RSRP) measurement as specified in the sounding reference signal (SRS) configuration, and reporting, to the serving network node, cross link interference (CLI) sounding reference signal (SRS) reference signal received power (RSRP) measurement results.

Another embodiment is directed to an apparatus that may include at least one processor and at least one memory comprising computer program code. The at least one memory and computer program code may be configured, with the at least one processor, to cause the apparatus at least to provide, to a serving network node, capability information indicating at least a capability of the apparatus to search for sounding reference signal (SRS) timing, receive sounding reference signal (SRS) configuration in a measurement request from the serving network node, perform at least one sounding reference signal (SRS) reference signal received power (RSRP) measurement as specified in the sounding reference signal (SRS) configuration, and report, to the serving network node, cross link interference (CLI) sounding reference signal (SRS) reference signal received power (RSRP) measurement results.

Another embodiment is directed to a method that may include receiving, by a serving network node, capability information indicating at least a capability of a user equipment to search for sounding reference signal (SRS) timing, obtaining, from a neighbour network node, a sounding reference signal (SRS) configuration for candidate aggressor user equipment, transmitting, to the user equipment, the sounding reference signal (SRS) configuration in a measurement request, receiving cross link interference (CLI) sounding reference signal (SRS) reference signal received power (RSRP) measurement results, and processing the measurement results for use in cross link interference (CLI) mitigation planning.

Another embodiment is directed to an apparatus that may include at least one processor and at least one memory comprising computer program code. The at least one memory and computer program code may be configured, with the at least one processor, to cause the apparatus at least to receive capability information indicating at least a capability of a user equipment to search for sounding reference signal (SRS) timing, obtain, from a neighbour network node, a sounding reference signal (SRS) configuration for candidate aggressor user equipment, transmit, to the user equipment, the sounding reference signal (SRS) configuration in a measurement request, receive cross link interference (CLI) sounding reference signal (SRS) reference signal received power (RSRP) measurement results, and process the measurement results for use in cross link interference (CLI) mitigation planning.

In an embodiment, the measurement results may include at least one or more timing offsets used by the user equipment.

In an embodiment, the capability information may include at least one of a search capable flag, search boundaries, or an indication of whether the cross link interference (CLI) sounding reference signal (SRS) reference signal received power (RSRP) measurement is valid or not valid.

In an embodiment, wherein the search capable flag may further include at least one of: an indication that the user equipment is able to adjust for a timing error within a certain timing error limit when performing the cross link interference (CLI) sounding reference signal (SRS) reference signal received power (RSRP) measurement, or an indication that the user equipment is able to adjust the timing error to a certain range within which a corresponding cross link interference (CLI) sounding reference signal (SRS) reference signal received power (RSRP) measurement accuracy is applied.

In an embodiment, the measurement request may include a cross link interference (CLI) sounding reference signal (SRS) reference signal received power (RSRP) measurement request for the user equipment to perform at least one of: a single sounding reference signal (SRS) reference signal received power (RSRP) measurement at a specified timing offset; multiple sounding reference signal (SRS) reference signal received power (RSRP) measurements at specified timing offsets; a single sounding reference signal (SRS) reference signal received power (RSRP) measurement at a specified timing offset with search enabled; a single sounding reference signal (SRS) reference signal received power (RSRP) measurement with timing of the measurement up to user equipment implementation; or a single sounding reference signal (SRS) reference signal received power (RSRP) measurement with search override and timing of the measurement up to user equipment implementation.

In an embodiment, the reporting may include reporting at least one of: a single measurement result and used timing offset; multiple measurement results and used timing offsets; two measurement results at specified timing offset and at search offset plus search verdict and accuracy assessment; single measurement result and used timing offset plus indication if search was used or not and search verdict; measured cross link interference (CLI) sounding reference signal (SRS) reference signal received power (RSRP) value; or measured cross link interference (CLI) sounding reference signal (SRS) reference signal received power (RSRP) value and accuracy or validity verdict.

In an embodiment, the user equipment may be a victim user equipment experiencing cross link interference (CLI) from an aggressor user equipment transmitting on same resources.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for cross link interference (CLI) sounding reference signal (SRS)-reference signal received power (RSRP) measurement conditions reporting, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

5G New Radio (NR) is largely designed to operate in Time Division Duplexing (TDD) mode with enhanced flexibility for link direction switching on a per cell basis. In other words, there is a capability of being able to dynamically switch between uplink (UL) and downlink (DL) transmission directions. This kind of flexibility offers enhanced capabilities for adapting according to the offered uplink and downlink traffic, but also comes with the potential drawback of undesirable Cross Link Interference (CLI). The CLI may appear in the form of gNB-2-gNB interference (i.e., one gNB transmitting while the other one receiving) and/or UE-2-UE interference (i.e., one UE transmitting—the aggressor, while the other UE—the victim—receiving on the same resources).

Figure 1:
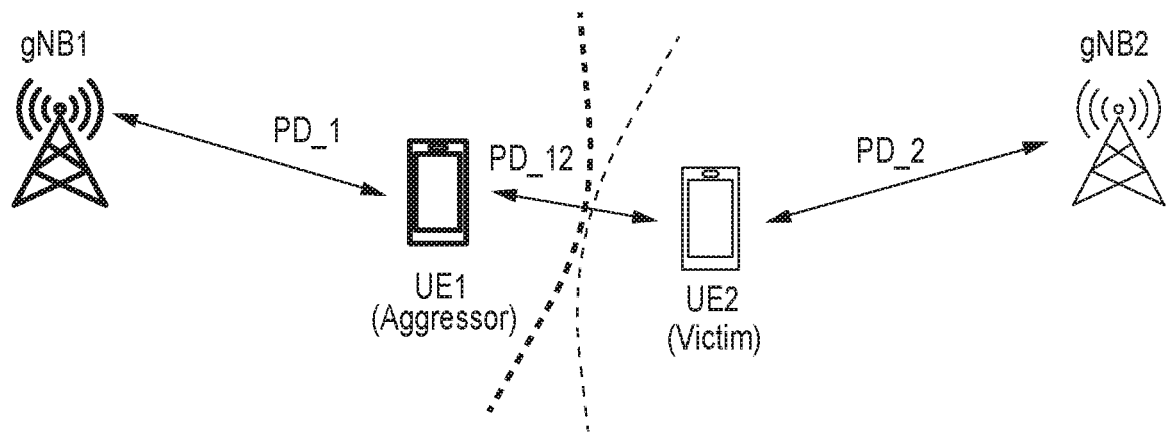
FIG. 1 illustrates a system diagram depicting an example of a UE-2-UE CLI scenario, according to some embodiments.

FIG. 1 illustrates a system diagram depicting an example of a UE-2-UE CLI scenario, according to some embodiments. As illustrated in the example of FIG. 1, the DL of UE2 (the victim in this example) is interfered with by the UL of UE1 (the aggressor in this example), with UE1 being served by a neighbour cell (gNB1) to the cell serving UE2 (gNB2). In the example of FIG. 1, PD_1 is the propagation delay between gNB1 and UE1, PD_12 is the propagation delay between UE1 and UE2, and PD_2 is the propagation delay between gNB2 and UE2.

In line with the 3GPP NR assumptions, time synchronicity between gNBs is assumed such that radio frame and subframe boundaries are fully aligned. The gNBs may have different link directions, adjusted either on a subframe, slot, or intra-slot resolution. The adjustment of link direction may be conducted on a radio frame configuration basis (e.g., 10 ms), on a resolution of dynamically selecting the next slot format. For NR, a slot is defined as 14 symbols (normal cyclic prefix (CP)) or 12 symbols (extended CP). The slot length, therefore, depends on the sub-carrier spacing (SCS); for example, the slot length equals 1/0.5/0.25/0.125 ms for 15/30/60/120 kHz SCS.

NR may support both paired and unpaired spectrum and seeks to maximize commonality between technical solutions, for example, allowing frequency division duplex (FDD) operation on a paired spectrum, different transmission directions in either part of a paired spectrum, TDD operation on an unpaired spectrum in which a transmission direction of time resources is not dynamically changed, and TDD operation on an unpaired spectrum in which a transmission direction of most time resources may dynamically change.

DL and UL transmission directions for data may be dynamically assigned on a per-slot basis at least in a time division multiplexing (TDM) manner. Transmission directions can include downlink, uplink, sidelink, and backhaul link NR supports at least semi-statically assigned DL/UL transmission direction as gNB operation. In other words, the assigned DL/UL transmission direction can be signaled to a UE.

Some objectives for CLI mitigation to support flexible resource adaptation for unpaired NR cells may include: specifying CLI measurements and reporting at a UE, e.g., CLI-received signal strength indicator (RSSI) and/or CLI-RSRP, specifying network coordination mechanism(s) including exchange of intended DL/UL configuration, and identifying conditions of coexistence among different operators in adjacent channels.

Two types of UE CLI measurements may be supported. These types of measurements include CLI SRS-RSRP and CLI RSSI. Regarding UE CLI SRS-RSRP measurements, in order to perform SRS transmission for CLI measurement at the aggressor UE, the timing advance (TA) value applied to the corresponding UL symbol is the same as the latest TA for regular UL symbols transmitted to the gNB. For SRS-RSRP measurement, the victim UE is not required to perform time tracking or time adjustment other than a constant offset relative to its own DL timing. The constant offset may be derived by UE implementation. Regarding UE CLI RSSI measurements, when UE performs CLI-RSSI measurement, the measurement timing may be derived by UE implementation within orthogonal frequency division multiplexing (OFDM) symbols configured for CLI-RSSI measurement.

In view of the above, certain embodiments described herein are able to at least improve on the accuracy of the UE CLI SRS-RSRP measurements.

Figure 2:
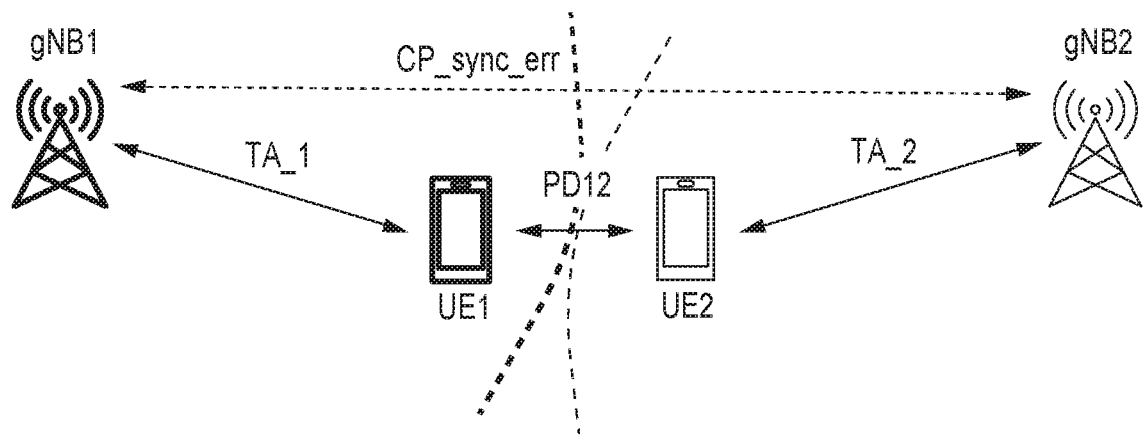
FIG. 2 illustrates another example of system diagram depicting an example of a UE-2-UE CLI SRS measurement scenario, according to some embodiments.

FIG. 2 illustrates another example of system diagram depicting an example of a UE-2-UE CLI SRS measurement scenario, according to some embodiments. As illustrated in the example of FIG. 2, the victim UE2 is requested by its serving gNB2 to measure the RSRP of SRS transmitted by aggressor UE1 connected to neighbour gNB1. The victim UE2 measuring the SRS transmitted by the aggressor poses the problem of determining—on the victim UE side—when an aggressor SRS measurement is meaningful and when it is not. One problem lies in the victim UE2 determining when it can be confident to measure the aggressor SRS.

In some embodiments, the two UEs, UE1 and UE2, will not be served by same gNB and will, in most cases, not be collocated. This means that the SRS transmission from UE1 will not arrive at UE2 time aligned with the arrival of other DL transmissions from the UE2 serving cell. This will, in most cases, lead to the aggressor SRS transmission not being aligned with the victim UE2 DL timing, and thereby the UE2 measurement window. Exactly how large the timing offset between the 2 UEs will be at the time of the SRS measurement will depend on UE1 and UE2 locations within the cells—of which the aggressor UE1 location is unknown to victim UE2.

Figure 3:
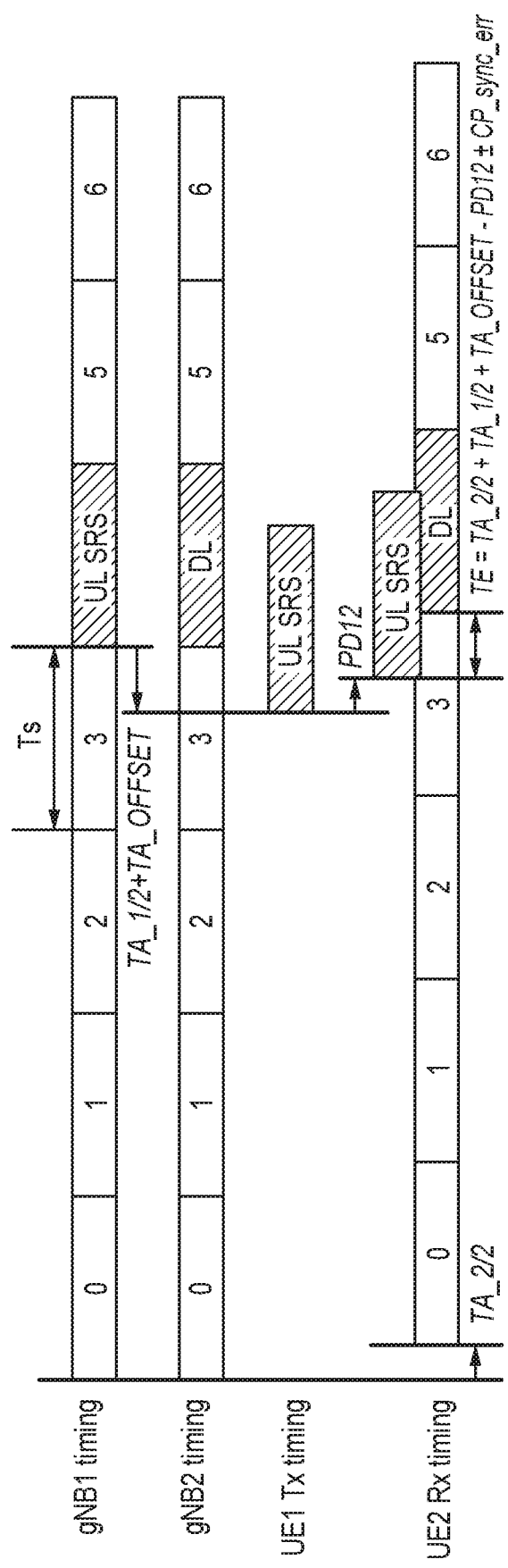
FIG. 3 illustrates one example of a UE-2-UE CLI SRS measurement timing scenario, according to an embodiment.

FIG. 3 illustrates one example of a UE-2-UE CLI SRS measurement timing scenario, according to an embodiment.

In some embodiments, the Timing Error (TE) for the SRS arrival at UE2 referenced to UE2 DL arrival may be, for instance, given by:

$$TE = TA\_1/2 + TA\_2/2 + TA\_OFFSET - PD12 \pm CP\_sync\_err \quad \text{(Equation 1)},$$

where $TA\_1$ and $TA\_2$ are the timing advance for UE1 and UE2, respectively. TA_OFFSET may be the timing advance (TA) offset defined in 3GPP TS 38.133 table 7.1.2-2, and PD12 may be the propagation delay between UE1 and UE2. CP_sync_err may refer to the cell phase synchronization accuracy for TDD defined for any pair of cells on the same frequency with overlapping coverage areas (See 3GPP TS 38.133 section 7.4).

The measurement Timing Error (TE) may impact the accuracy of the RSRP measurement. Specifically, the accuracy may be degraded when TE becomes larger than the cyclic prefix (CP). For example, simulation results demonstrate that the measurement accuracy is degraded when the TE is higher than the normal CP, which may be for instance 2.35 us/0.59 μs for SCS 30/120 kHz, respectively.

As shown by equation 1, the TE may be impacted by several parameters of which more are unknown to the victim UE2, which needs to perform the SRS RSRP measurement. The TA of UE2 is known and so may be the TA_OFFSET, which is fixed for FR1 and FR2. However, the TA of UE1, the path delay between UE1 and UE2, and the cell phase synchronization accuracy are unknown to the measurement UE.

The aggressor UE1 may use same TA as for regular UL to serving gNB1 and the measurement UE2 may use a constant timing offset relative to its own DL timing for the SRS measurement. The question becomes whether deployment and operating scenarios may exist resulting in TE>CP even with a constant timing offset applied.

It is noted that interference levels may remain significant even at high UE-2-UE distances (e.g., distances greater than 700 m). Furthermore, the UE-2-UE path delay may exceed the CP boundary at a UE-2-UE distance of approximately 350 m (SCS 60 kHz) and 176 m (SCS 120 kHz). This means that, for cell inter site distance (ISD) higher than 350 m(FR1)/176 m(FR2), the measurement accuracy will start to degrade for worst case aggressor/victim locations in a line-of-sight (LOS) scenario. Non-line-of-sight (NLOS) cases may also exist which will increase the UE-2-UE path delay for same cell ISD, as illustrated in the example of FIG. 4.

Figure 4:
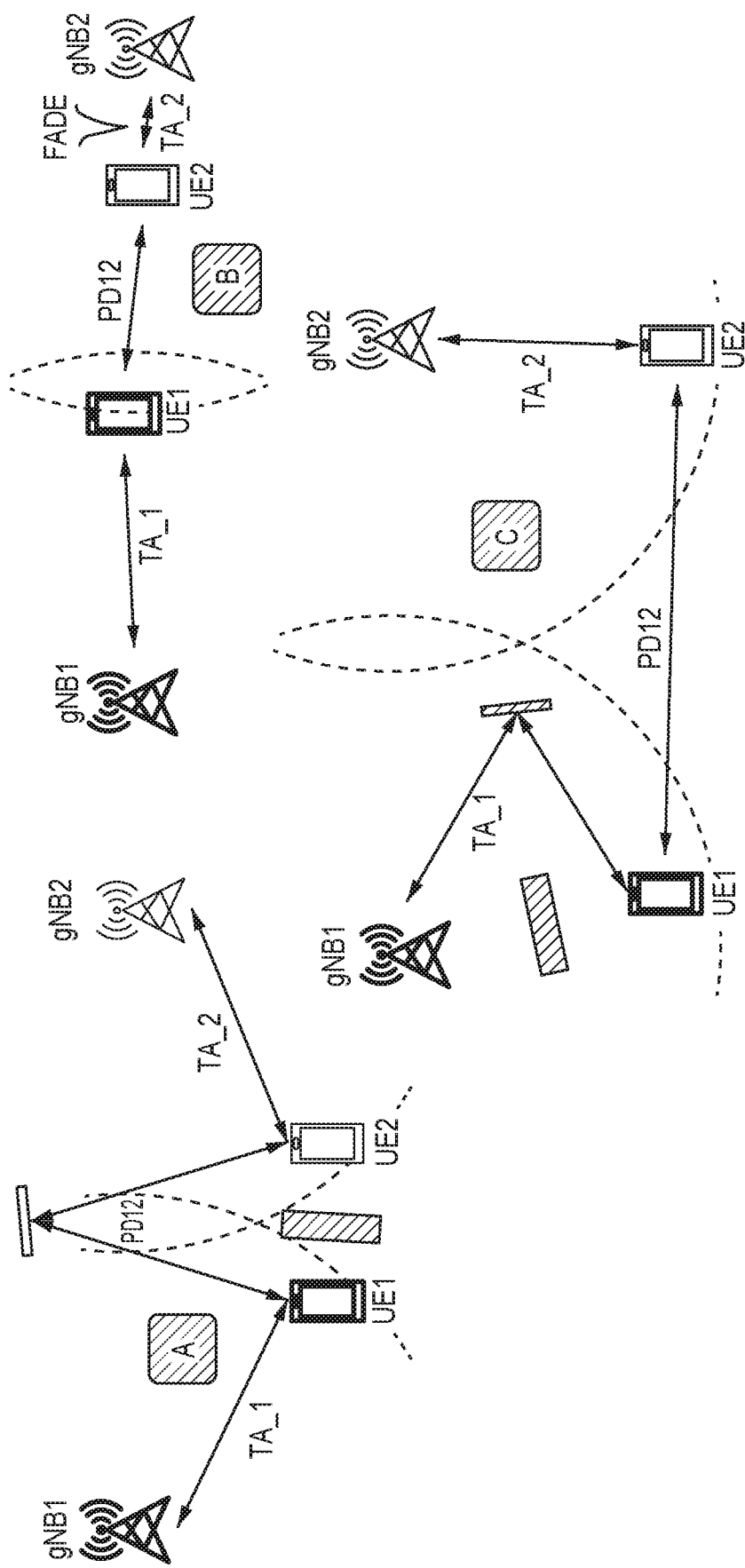
FIG. 4 illustrates example UE CLI scenarios with enlarged UE-2-UE path delays, according to certain embodiments.

In particular, FIG. 4 illustrates example UE CLI scenarios with enlarged UE-2-UE path delays. Scenario A of FIG. 4 depicts reflection interference path, scenario B depicts victim UE in a DL fade, and scenario C depicts large antenna gain in CLI direction due to blocked LOS path to serving gNB.

The cell phase synchronization accuracy is specified in 3GPP TS 38.133 to be better than 3 us as an absolute deviation in frame start timing. However, a 3 ns TE from CP_sync_err alone corresponds to an SRS RSRP measurement error of approximately 1 dB/5 dB for an SCS of 30/120 kHz, respectively. As such, it is evident that use cases may exist with TE large enough to impact the SRS RSRP measurement accuracy.

In view of the above, it can be seen that, when the TE for CLI SRS RSRP measurements becomes higher than the CP, the accuracy is degraded. The TE is unknown to the victim UE reporting the measured value and thus the serving gNB cannot distinguish a case of an accurate but low interference measurement from an inaccurate high TE measurement.

Furthermore, the measurement UE may apply a constant offset derived by UE implementation, which means that the gNB has no information about timing conditions used for measurement results reported by different UEs in the cell. The value of the CLI RSRP measurement for network CLI mitigation planning is consequently reduced. As will be discussed in detail below, example embodiments address at least the issues discussed above and, as a result, provide several technical improvements to communications systems, such as 5G NR.

In order to increase the gNB awareness of the CLI SRS RSRP measurement conditions for all UEs in the gNB's serving cell, certain embodiments provide novel updates to the measurement procedure. According to one embodiment, a UE may be configured to include into the CLI SRS RSRP measurement reporting whether the reported RSRP represents a valid CLI SRS RSRP measurement. In an embodiment, the UE may report, to the serving gNB, on its capability to search for SRS timing as a new capability information. For example, the information may indicate that the UE is able to adjust for the timing error within a certain TE limit, when performing CLI SRS-RSRP measurement, so that the CLI SRS-RSRP measurement accuracy meets requirements. Additionally or alternatively, the information may indicate that the UE is able to adjust the timing error to certain range, within which a corresponding CLI SRS-RSRP measurement accuracy (or range) is applied.

In some embodiments, UE reporting of CLI SRS RSRP measurement result(s) may include used timing offset(s). According to certain embodiments, UE reporting of CLI SRS RSRP measurement result(s) may include used timing offset(s), search indication and/or search result verdict and parameters.

According to an embodiment, a gNB may request for CLI SRS RSRP measurement with UE search for timing disabled and/or may request for CLI SRS RSRP measurements for one SRS configuration at multiple specified timing offsets. In certain embodiments, this information may be part of CLI measurement object configuration for the UE.

According to an embodiment, the UE may report the CLI SRS RSRP measurement results for one SRS configuration at multiple gNB specified timing offsets. This information may be reported by the UE as part of CLI measurement reporting. In another embodiment, the gNB may request for CLI SRS RSRP measurements for one SRS configuration with UE search for timing offset enabled, for example, as part of CLI measurement object configuration for the UE.

In some embodiments, the CLI SRS RSRP measurement may be performed by the measurement UE at a constant offset referenced to gNB DL timing or some UEs may implement SRS timing offset search capability. With SRS search enabled, the UE may obtain a direct measure of the timing offset of the SRS compared to its own DL timing and produce an accurate CLI SRS RSRP measurement result even at timing error larger than the CP.

With the UE reporting of both the CLI SRS RSRP measurement results and the used time offsets, for both fixed offset and search enabled measurements, the gNB may obtain visibility of the full conditions and may select the most appropriate measurement configuration/result values based on a trade-off between accuracy, offset and speed.

In the following, some example embodiments of the enhanced CLI SRS RSRP measurement procedure are described for at least two scenarios. A first scenario is one in which the gNB takes control of measurement conditions (which may be referred to as case A), and a second scenario is where selection of measurement timing remains up to UE implementation (which may be referred to as case B).

In the case where a gNB dictates CLI SRS RSRP measurement conditions (case A), the gNB is the initiator of the measurement request and dictate exact measurement conditions. As such, all measurement conditions may be controlled by and, therefore, known by the gNB and not up to UE implementation. In an embodiment, the measurement conditions may be signalled from the gNB to the UE as part of a new CLI measurement object (e.g., CLI measObj), for example, as part of RRC signalling.

The gNB has or may obtain information on parameters necessary for the UE to determine the timing offset to be applied to perform CLI SRS RSRP measurements, such as TA_OFFSET, TA_1, and potentially UE1 & UE2 positions to assist setting reasonable timing offset(s) for the measurement(s). Subsequently, the measurement results may be used on the network side for CLI mitigation planning. As such, control and awareness of measurement conditions is well positioned at the gNB.

Figure 5:
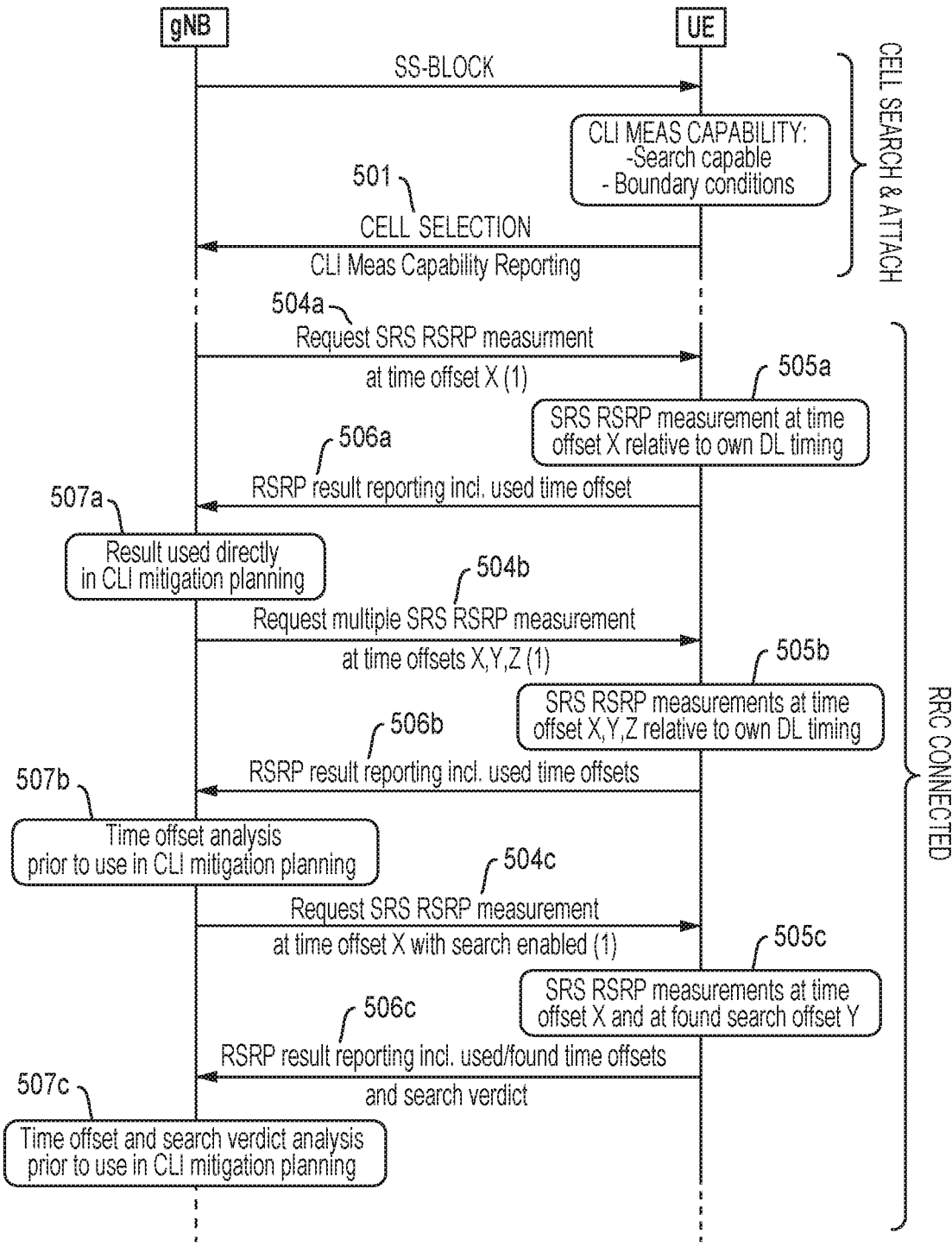
FIG. 5 illustrates an example signaling diagram depicting a measurement procedure, according to certain embodiments.

FIG. 5 illustrates an example signaling diagram depicting a measurement procedure, according to certain embodiments (e.g., case A). In the example of FIG. 5, example embodiments of the measurement procedure are described for three different measurement request scenarios. The measurement request scenarios may include (i) requesting a single SRS RSRP measurement at specified timing offset, (ii) multiple SRS RSRP measurements at specified timing offsets, or (iii) a single SRS RSRP measurement at specified timing offset (reference for search) with search enabled. It is noted that, while FIG. 5 depicts the scenarios in series, this is merely for purposes of illustration as the scenarios may be performed individually according to example embodiments. In an example embodiment, the new configuration parameters may be added to the CLI measObj configuration.

As illustrated in the example of FIG. 5, for example during cell attach, at 501, the UE may report, to the serving gNB, capability information that includes the UE's capability to search for SRS timing. In some embodiments, the capability report may include a search capable flag (e.g., Yes/No) and/or search boundaries such as maximum time offset reference own DL timing.

In an embodiment, the serving gNB may obtain, from a neighbour gNB, the SRS configuration for a candidate aggressor UE. The candidate aggressor UE may be transmitting SRS with timing identical to that used for its regular UL transmissions.

According to certain embodiments, at 504, the serving gNB may provide the SRS configuration, e.g., via CLI SRS RSRP measurement request, to the victim UE. For example, in one embodiment, the serving gNB may request, at 504a, single SRS RSRP measurement at specified timing offset. In another embodiment, the serving gNB may request, at 504b, multiple SRS RSRP measurements at specified timing offsets. In yet another embodiment, the serving gNB may request, at 504c, single SRS RSRP measurement at specified timing offset (reference for search) with search enabled.

In some embodiments, at 505, the victim UE may then perform the SRS RSRP measurement(s) as specified in the measurement request received from the serving gNB. For example, in one embodiment, the UE may, at 505a, perform SRS RSRP measurement at the specified timing offset relative to own DL timing. In another embodiment, the UE may, at 505b, perform multiple SRS RSRP measurements at the specified timing offsets. In yet another embodiment, the UE may, at 505c, perform SRS RSRP measurement at the specified timing offset and at found search offset.

According to certain embodiments, at 506, the UE may then return to the serving gNB the measurement result(s). For example, in an embodiment, the UE may provide, at 506a, the single measurement result and used timing offset. In another embodiment, the UE may provide, at 506b, the multiple measurement results and used timing offsets. In yet another embodiment, the UE may provide, at 506c, the two measurement results at specified timing offset and at search offset plus search verdict and accuracy assessment. In an embodiment, the accuracy assessment is enabled by the UE search capability. By obtaining the time offset of the SRS arrival the accuracy degradation at the gNB specified time offset can be evaluated.

In an embodiment, at 507, the gNB may process the UE measurement reporting as input for CLI mitigation planning. For example, in one embodiment, the gNB may, at 507a, use the measurement result directly in CLI mitigation planning. In another embodiment, the gNB may, at 507b, perform time offset analysis prior to use in CLI mitigation planning. In yet another embodiment, the gNB may, at 507c, perform time offset and search verdict analysis prior to use in CLI mitigation planning.

According to certain embodiments, the different measurement request scenarios may be triggered by gNB when the gNB has adequate information to estimate the correct timing or when measurement speed is more important than accuracy, when the gNB has inadequate information and may need to search for best timing (highest power offset closest to optimum timing), and/or when the gNB has inadequate information and UE has search capability.

It is noted that any of the above may be extended to the case where a gNB is requesting measurement of multiple SRS sequences representing multiple interfering UEs located in same or different neighbour cells.

Figure 6:
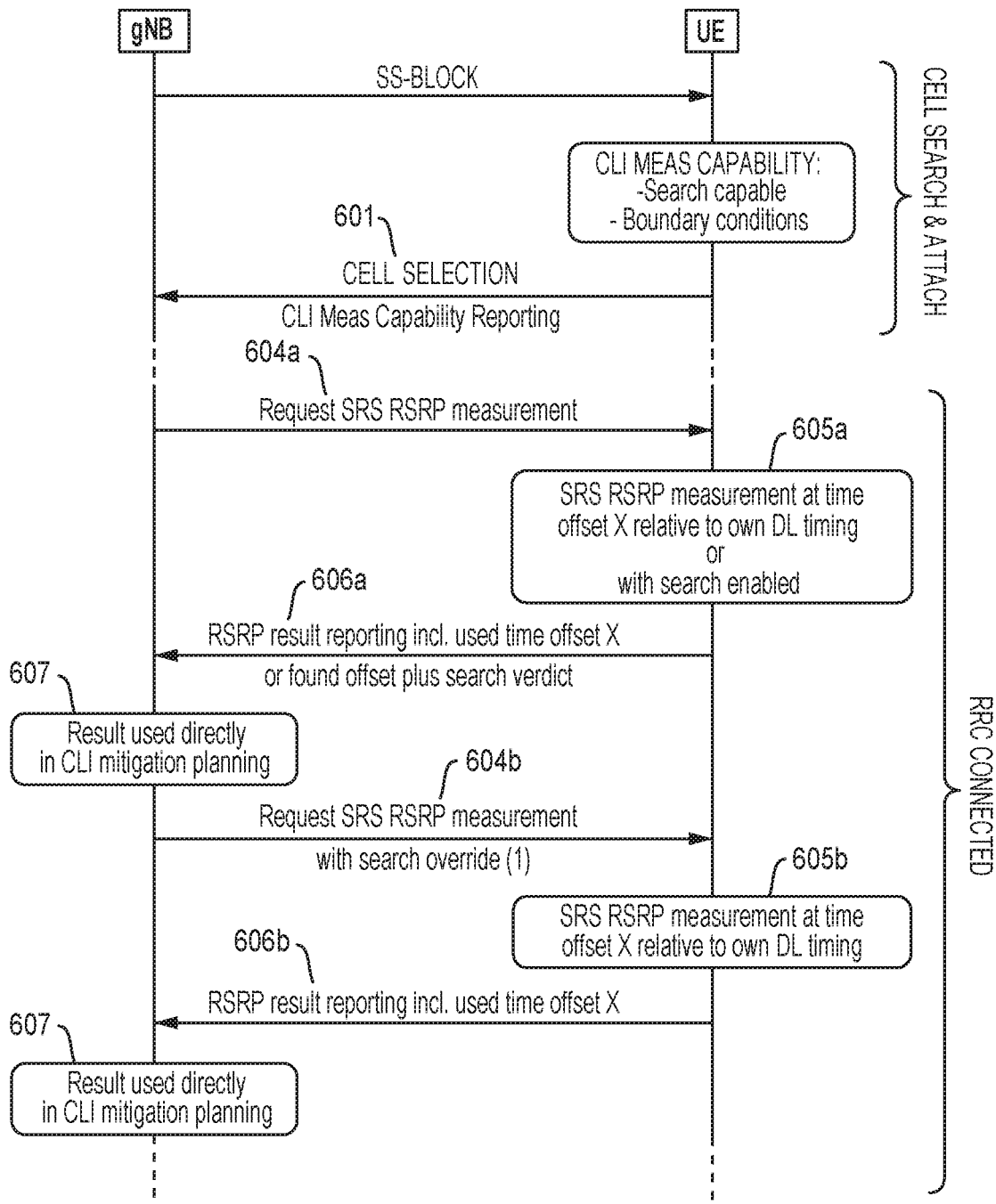
FIG. 6 illustrates an example signaling diagram depicting a measurement procedure, according to an embodiment.

In the case where a UE dictates CLI SRS RSRP measurement timing conditions with gNB reporting (case B), the UE remains the master and dictates the timing conditions for the CLI-SRS RSRP measurement (i.e., UE autonomous behaviour mode). FIG. 6 illustrates an example signaling diagram depicting a measurement procedure, according to certain embodiments (e.g., case B). In the example of FIG. 6, example embodiments of the measurement procedure are described for two different measurement request scenarios. The measurement request scenarios may include (i) single SRS RSRP measurement or (ii) single SRS RSRP measurement with search override. According to an embodiment, the timing of the measurement may be up to UE implementation. In an example embodiment, the new configuration parameters may be added to the CLI measObj configuration.

As illustrated in the example of FIG. 6, for example during cell attach, at 601, the UE may report, to the serving gNB, capability information that includes the UE's capability to search for SRS timing. In some embodiments, the capability report may include a search capable flag (e.g., Yes/No) and/or search boundaries such as maximum time offset relative to own DL timing.

In an embodiment, the serving gNB may obtain, from a neighbour gNB, the SRS configuration for a candidate aggressor UE. The candidate aggressor UE may be transmitting SRS with timing identical to that used for its regular UL transmissions.

According to certain embodiments, at 604, the serving gNB may provide the SRS configuration, e.g., via CLI SRS RSRP measurement request, to the victim UE. For example, in one embodiment, the serving gNB may request, at 604a, single SRS RSRP measurement (where timing of the measurement is up to UE implementation). In another embodiment, the serving gNB may request, at 604b, single SRS RSRP measurement with search override (where timing of the measurement is up to UE implementation).

In some embodiments, at 605, the victim UE may then perform the SRS RSRP measurement(s) as specified in the measurement request received from the serving gNB. For example, in one embodiment, the UE may, at 605a, perform SRS RSRP measurement at the UE specified timing offset relative to own DL timing or with search enabled. In another embodiment, the UE may, at 605b, perform SRS RSRP measurement at the UE specified timing offset relative to own DL timing.

According to certain embodiments, at 606, the UE may then return to the serving gNB the measurement result(s). For example, in an embodiment, the UE may provide, at 606a, single measurement result and used timing offset along with an indication if search was used or not and search verdict. In another embodiment, the UE may provide, at 606b, single measurement result and used timing offset.

In an embodiment, at 607, the gNB may process the UE measurement reporting as input for CLI mitigation planning. According to some embodiments, the different measurement request scenarios may be triggered by the gNB when the gNB wants to make use of potential search enabled UE capabilities, and/or when the gNB wants to disable search features, e.g., for measurement speed or to obtain a reference measurement at fixed timing offset.

As for the case where a gNB dictates CLI SRS RSRP measurement conditions, the case where the UE dictates CLI SRS RSRP measurement timing conditions will allow a gNB to evaluate the delta timing offset between search enabled and disabled measurements and, based on knowledge of accuracy degradation versus timing offset, obtain an associated accuracy impact for the fixed offset measurement. The gNB, however, will not be able to obtain an SRS RSRP measurement at gNB specified timing offset, e.g., exactly at victim UE DL timing (the actual interference scenario). In contrast, this is possible under the case where the gNB dictates the measurement conditions.

Again, it is noted that any of the above may be extended to the case in which a gNB is requesting measurement of multiple SRS sequences representing multiple interfering UEs located in same or different neighbour cells.

Figure 7:
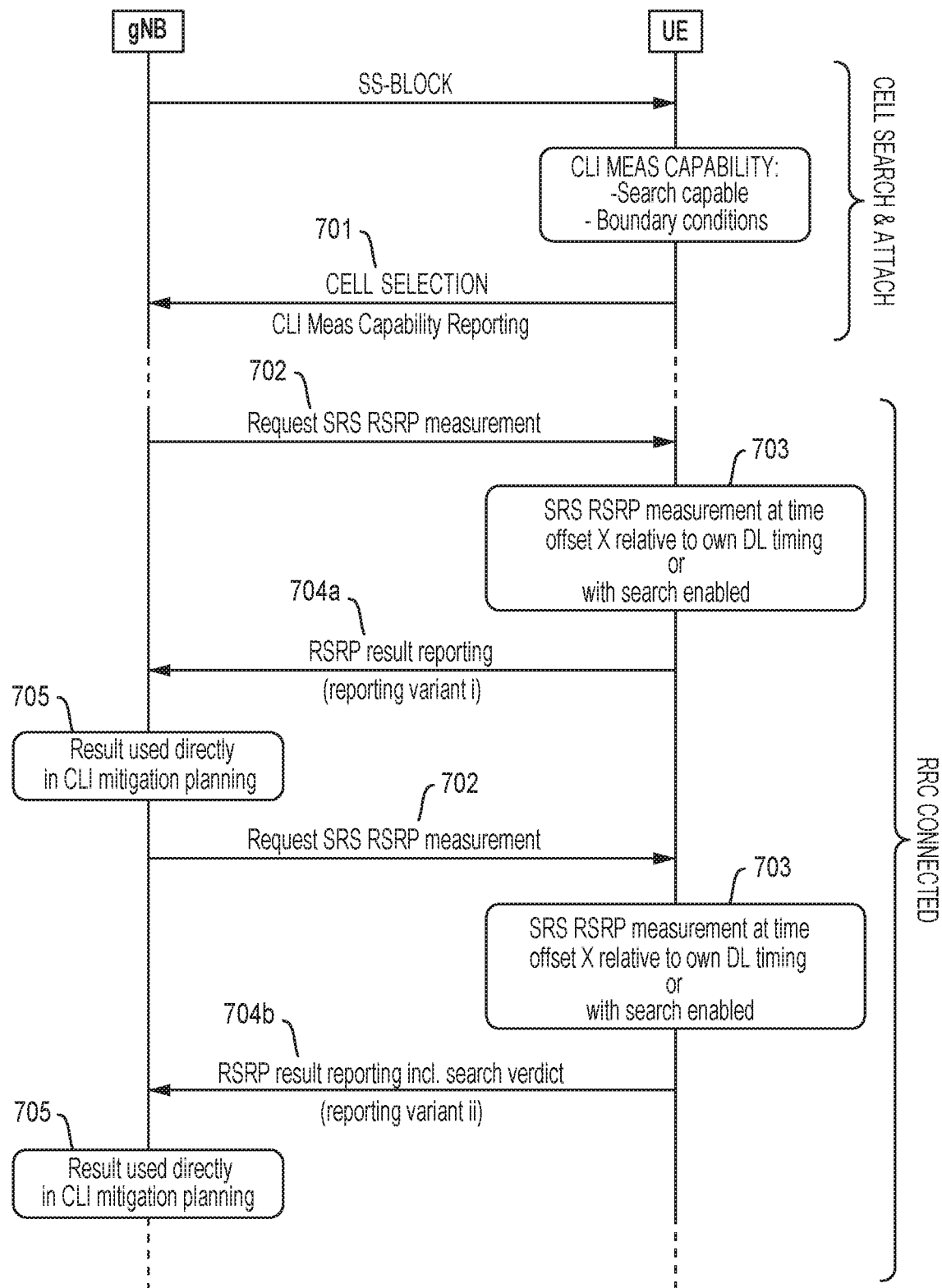
FIG. 7 illustrates an example signaling diagram depicting a measurement procedure, according to an embodiment.

In the case where a UE determines the CLI-SRS RSRP measurement timing conditions (which may be referred to as case C), as currently specified, the UE remains the master and dictates the timing conditions for the CLI-SRS RSRP measurement (i.e., UE autonomous behaviour mode). FIG. 7 illustrates an example signaling diagram depicting a measurement procedure, according to certain embodiments (e.g., case C). In the example of FIG. 7, example embodiments of the measurement procedure are described for two different measurement reporting variants (i) and (ii).

As illustrated in the example of FIG. 7, for example during cell attach, at 701, the UE may report, to the serving gNB, capability information that includes the UE's capability to obtain and report a time aligned clean SRS measurement result. The capability report may include one or more of: (a) an indication of valid/not valid CLI SRS RSRP measurement; (b) a search capable flag (Yes/No), with a Yes flag indicating that the UE is able to adjust the timing error within a certain TE limit, when performing CLI SRS-RSRP measurement; (c) a search capable flag (Yes/No), with Yes indicating that the UE is able to adjust the timing error to a certain range, within which a corresponding CLI SRS-RSRP measurement accuracy (or range) is applied; and/or (d) search boundaries such as maximum time offset relative own DL timing, which indicates that the UE can fix the TE to no more than a maximum value.

In an embodiment, at 702, the serving gNB may provide the CLI SRS RSRP measurement request to the victim UE. According to one embodiment, at 703, the victim UE may perform the SRS RSRP measurement as specified in the measurement request.

At 704, the victim UE may return a measurement report to the gNB. For example, in an embodiment, at 704*a*, the measurement report may include at least the measured CLI SRS-RSRP value. In certain embodiments, the measurement report at 704*a* may also include an indication whether measurement result is valid or not. In this embodiment, if search capable flag=Yes, the RSRP measurement result may be assumed accurate by gNB; whereas if search capable flag=No, the RSRP measurement result may be considered inaccurate unless the deployment scenario in general can guarantee TE<CP.

In another embodiment, at 704*b*, the measurement report may include at least the measured CLI SRS-RSRP value and an accuracy or validity verdict. In this embodiment, if search capable flag=Yes and accuracy verdict is positive, then the RSRP measurement result may be assumed accurate by gNB. If search capable flag=Yes and accuracy verdict is negative, then the RSRP measurement result may be assumed inaccurate by gNB. If search capable flag=No, the RSRP measurement result may be considered inaccurate unless the deployment scenario in general can guarantee TE<CP.

Then, as further illustrated in the example of FIG. 7, at 705, the gNB may process the UE measurement reporting as input for CLI mitigation planning.

Figure 8A:
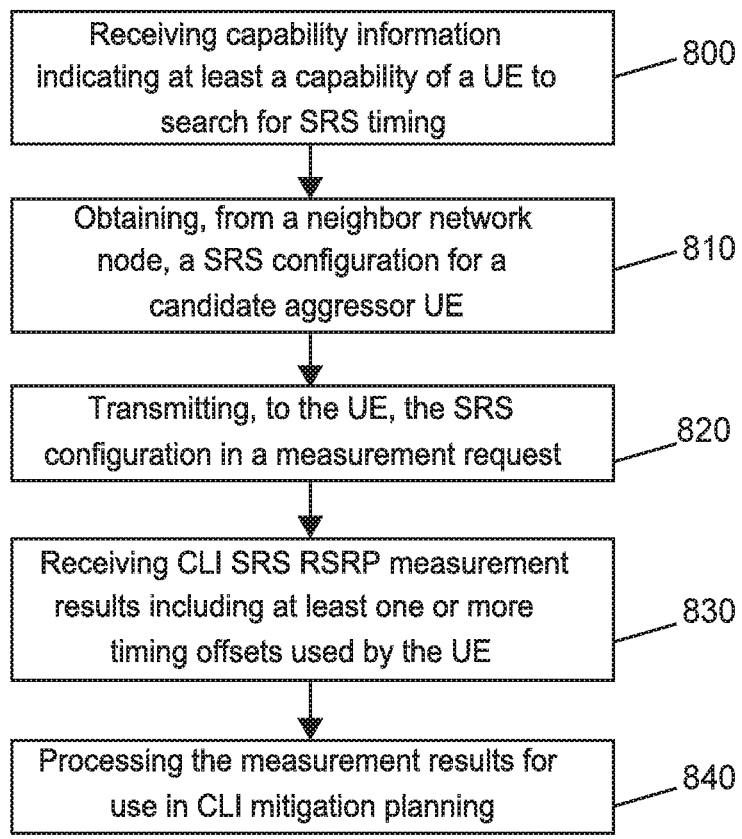
FIG. 8a illustrates an example flow diagram of a method, according to one embodiment.

FIG. 8*a* illustrates an example flow diagram of a method for CLI SRS RSRP measurement and reporting, according to one example embodiment. In certain example embodiments, the flow diagram of FIG. 8*a* may be performed by a network entity or network node in a 3GPP system, such as LTE or 5G NR. For instance, in some example embodiments, the method of FIG. 8*a* may be performed by a gNB as depicted in the example signaling diagrams of FIGS. 5-7. Therefore, in certain embodiments, the method may include any of the procedures performed by the gNB in FIGS. 5-7.

As illustrated in the example of FIG. 8*a*, the method may include, at 800, receiving capability information indicating at least a capability of a UE to search for SRS timing. In one example, the UE may be a victim UE experiencing CLI from an aggressor UE that is transmitting on the same resources that the victim UE is receiving on. In some embodiments, the capability information may indicate the user equipment's capability to obtain and report a time aligned clean SRS measurement result. According to certain embodiments, the capability information may also include one or more of a search capable flag, search boundaries, or an indication of whether the CLI SRS RSRP measurement is valid or not valid. In some embodiments, the search capable flag may include an indication that the UE is able to adjust for a timing error within a certain timing error limit when performing the CLI SRS RSRP measurement, and/or an indication that the UE is able to adjust the timing error to a certain range within which a corresponding CLI SRS RSRP measurement accuracy is applied. For example, in one embodiment, when the search capable flag is set to "Yes" it indicates that the UE is able to adjust the timing error within a certain timing error limit when performing CLI SRS RSRP measurement. In another embodiment, when the search capable flag is set to "Yes" it indicates that the UE is able to adjust the timing error to a certain range within which a corresponding CLI SRS RSRP measurement accuracy (or range) is applied.

In an embodiment, the method of FIG. 8*a* may further include, at 810, obtaining, from a neighbour network node, an SRS configuration for a candidate aggressor UE. According to one example, the candidate aggressor UE is transmitting SRS with timing identical to that used for its regular UL transmission. In one embodiment, the method may also include, at 820, transmitting, to the UE, the SRS configuration in a measurement request, such as a CLI SRS RSRP measurement request. According to some embodiments, the measurement request may include one or more of: a single SRS RSRP measurement at a specified timing offset, multiple SRS RSRP measurements at specified timing offsets, a single SRS RSRP measurement at a specified timing offset with search enabled, a single SRS RSRP measurement with timing of the measurement up to UE implementation, and/or a single SRS RSRP measurement with search override and timing of the measurement up to UE implementation.

According to an embodiment, the method may also include, at 830, receiving CLI SRS RSRP measurement results including at least one or more timing offsets used by the UE. In some embodiments, the receiving 830 may further include receiving one or more of: a single measurement result and used timing offset, multiple measurement results and used timing offsets, two measurement results at specified timing offset and at search offset plus search verdict and accuracy assessment, a single measurement result and used timing offset plus an indication if search was used or not and search verdict, a single measurement result and used timing offset, measured CLI SRS RSRP value, and/or a measured CLI SRS RSRP value and accuracy or validity verdict.

In one embodiment, when the measured CLI SRS RSRP value is received, measured CLI SRS RSRP value may include an indication of whether the measurement result is valid or not. For example, if the search capable flag is set to "Yes," the RSRP measurement result is assumed to be accurate; and, if the search capable flag is set to "No," the RSRP measurement result is assumed to be inaccurate unless the deployment scenario can guarantee that TE<CP. In one embodiment, when the measured CLI SRS RSRP value and an accuracy or validity verdict is received, the accuracy of the RSRP measurement result may be determined from the search capable flag and the accuracy verdict. For example, if the search capable flag is set to "Yes" and the accuracy verdict is positive, the RSRP measurement result may be assumed accurate. If the search capable flag is set to "Yes" and the accuracy verdict is negative, the RSRP measurement result may be assumed to be inaccurate. If the search capable flag is set to "No," the RSRP measurement result may be inaccurate unless the deployment scenario in general can guarantee TE<CP. In an embodiment, the method may then include, at 840, processing the measurement results for use in cross link interference (CLI) mitigation planning.

Figure 8B:
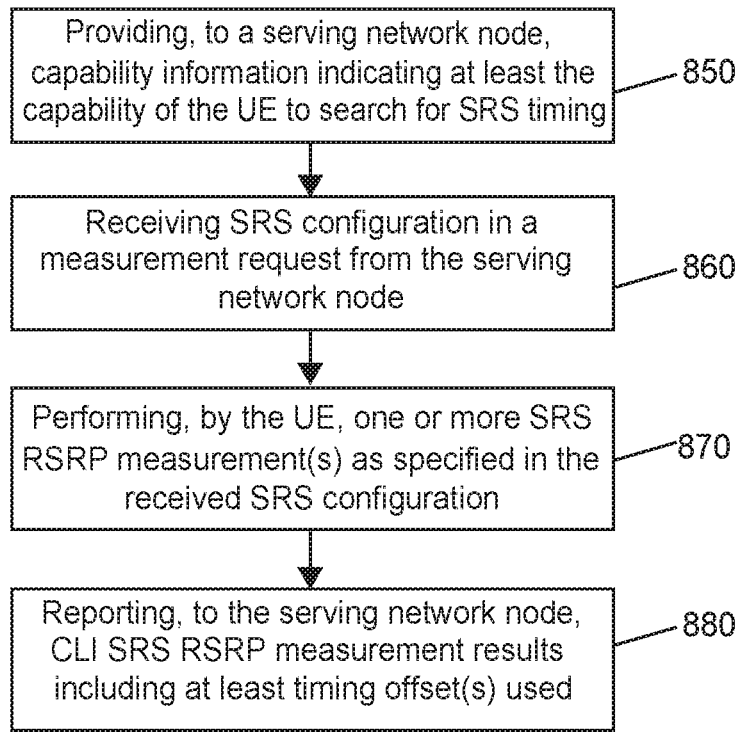
FIG. 8b illustrates an example flow diagram of a method, according to another embodiment.

FIG. 8*b* illustrates an example flow diagram of a method for CLI SRS RSRP measurement reporting, according to one example embodiment. In certain example embodiments, the flow diagram of FIG. 8*b* may be performed by a network entity or network node in a 3GPP system, such as LTE or 5G NR. For instance, in some example embodiments, the method of FIG. 8*b* may be performed by a UE as depicted in the example diagrams of FIGS. 5-7. In an embodiment, the UE may be a victim UE experiencing CLI from an aggressor UE transmitting on same resources. Therefore, in certain embodiments, the method may include any of the procedures performed by the UE in FIGS. 5-7.

As illustrated in the example of FIG. 8*b*, the method may include, at 850, providing, to a serving network node, capability information indicating at least the capability of the UE to search for SRS timing. In some embodiments, the providing 850 may include providing the capability information to indicate the UE's capability to obtain and report a time aligned clean SRS measurement result. According to certain embodiments, the capability information may also include one or more of a search capable flag, search boundaries, or an indication of whether the CLI SRS RSRP measurement is valid or not valid. In some embodiments, the search capable flag may include an indication that the UE is able to adjust for a timing error within a certain timing error limit when performing the CLI SRS RSRP measurement, and/or an indication that the UE is able to adjust the timing error to a certain range within which a corresponding CLI SRS RSRP measurement accuracy is applied.

In an embodiment, the method of FIG. 8*b* may also include, at 860, receiving sounding reference signal (SRS) configuration in a measurement request from the serving network node, such as a CLI SRS RSRP measurement request. According to some embodiments, the measurement request may include one or more of: a single SRS RSRP measurement at a specified timing offset, multiple SRS RSRP measurements at specified timing offsets, a single SRS RSRP measurement at a specified timing offset with search enabled, a single SRS RSRP measurement with timing of the measurement up to UE implementation, and/or a single SRS RSRP measurement with search override and timing of the measurement up to UE implementation.

In some embodiments, the method may also include, at 870, performing, by the UE, one or more SRS RSRP measurement(s) as specified in the received SRS configuration. The method may then include, at 880, reporting, to the serving network node, CLI SRS RSRP measurement results including at least one or more timing offsets used by the UE. In some embodiments, the reporting 880 may include reporting one or more of: a single measurement result and used timing offset, multiple measurement results and used timing offsets, two measurement results at specified timing offset and at search offset plus search verdict and accuracy assessment, a single measurement result and used timing offset plus an indication if search was used or not and search verdict, a single measurement result and used timing offset, a measured CLI SRS RSRP value, and/or a measured CLI SRS RSRP value and accuracy or validity verdict.

Figure 9A:
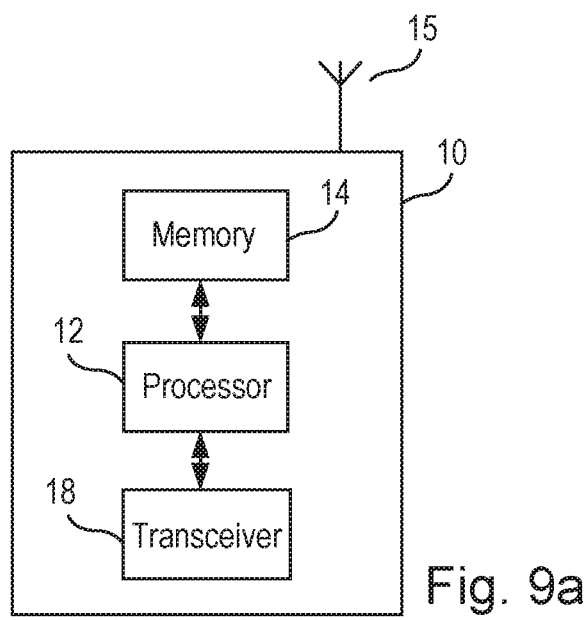
FIG. 9a illustrates an example block diagram of an apparatus, according to an embodiment.

FIG. 9*a* illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9*a*.

As illustrated in the example of FIG. 9*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10.

Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIG. 5-7 or 8a. In some embodiments, apparatus 10 may be configured to perform a procedure for CLI SRS RSRP measurement conditions reporting, for example. In an embodiment, apparatus 10 may represent a network node, such as a gNB.

In an embodiment, apparatus 10 may be controlled by memory 14 and processor 12 to receive capability information indicating at least a capability of a UE to search for SRS timing. In one example, the UE may be a victim UE experiencing CLI from an aggressor UE that is transmitting on the same resources that the victim UE is receiving on. In some embodiments, the capability information may indicate the UE's capability to obtain and report a time aligned clean SRS measurement result. According to certain embodiments, the capability information may also include one or more of a search capable flag, search boundaries, or an indication of whether the CLI SRS RSRP measurement is valid or not valid. In some embodiments, the search capable flag may include an indication that the UE is able to adjust for a timing error within a certain timing error limit when performing the CLI SRS RSRP measurement, and/or an indication that the UE is able to adjust the timing error to a certain range within which a corresponding CLI SRS RSRP measurement accuracy is applied. For example, in one embodiment, when the search capable flag is set to "Yes" it indicates to apparatus 10 that the UE is able to adjust the timing error within a certain timing error limit when performing CLI SRS RSRP measurement. In another embodiment, when the search capable flag is set to "Yes" it indicates to apparatus 10 that the UE is able to adjust the timing error to a certain range within which a corresponding CLI SRS RSRP measurement accuracy (or range) is applied.

In an embodiment, apparatus 10 may be controlled by memory 14 and processor 12 to obtain, from a neighbour network node, a SRS configuration for a candidate aggressor UE. According to one example, the candidate aggressor UE is transmitting SRS with timing identical to that used for its regular UL transmission. In one embodiment, apparatus 10 may also be controlled by memory 14 and processor 12 to transmit, to the UE, the SRS configuration in a measurement request, such as a CLI SRS RSRP measurement request. According to some embodiments, the measurement request may include one or more of: a single SRS RSRP measurement at a specified timing offset, multiple SRS RSRP measurements at specified timing offsets, a single SRS RSRP measurement at a specified timing offset with search enabled, a single SRS RSRP measurement with timing of the measurement up to UE implementation, and/or a single SRS RSRP measurement with search override and timing of the measurement up to UE implementation.

According to an embodiment, apparatus 10 may be controlled by memory 14 and processor 12 to receive CLI SRS RSRP measurement results including at least one or more timing offsets used by the UE. In some embodiments, apparatus 10 may be further controlled by memory 14 and processor 12 to receive one or more of: a single measurement result and used timing offset, multiple measurement results and used timing offsets, two measurement results at specified timing offset and at search offset plus search verdict and accuracy assessment, single measurement result and used timing offset plus indication if search was used or not and search verdict, single measurement result and used timing offset, measured CLI SRS RSRP value, and/or measured cross link interference (CLI) sounding reference signal (SRS) reference signal received power (RSRP) value and accuracy or validity verdict.

In one embodiment, when the measured CLI SRS RSRP value is received, the measured CLI SRS RSRP value may include an indication of whether the measurement result is valid or not. For example, if the search capable flag is set to "Yes," the RSRP measurement result may be assumed by apparatus 10 to be accurate; and, if the search capable flag is set to "No," the RSRP measurement result may be assumed by apparatus 10 to be inaccurate unless the deployment scenario can guarantee that TE<CP. In one embodiment, when the measured CLI SRS RSRP value and an accuracy or validity verdict is received, the accuracy of the RSRP measurement result may be determined from the search capable flag and the accuracy verdict. For example, if the search capable flag is set to "Yes" and the accuracy verdict is positive, the RSRP measurement result may be assumed accurate by apparatus 10. If the search capable flag is set to "Yes" and the accuracy verdict is negative, the RSRP measurement result may be assumed to be inaccurate by apparatus 10. If the search capable flag is set to "No," the RSRP measurement result may be assumed to be inaccurate by apparatus 10 unless the deployment scenario in general can guarantee TE<CP. In an embodiment, apparatus 10 may be controlled by memory 14 and processor 12 to process the measurement results for use in cross link interference (CLI) mitigation planning.

Figure 9B:
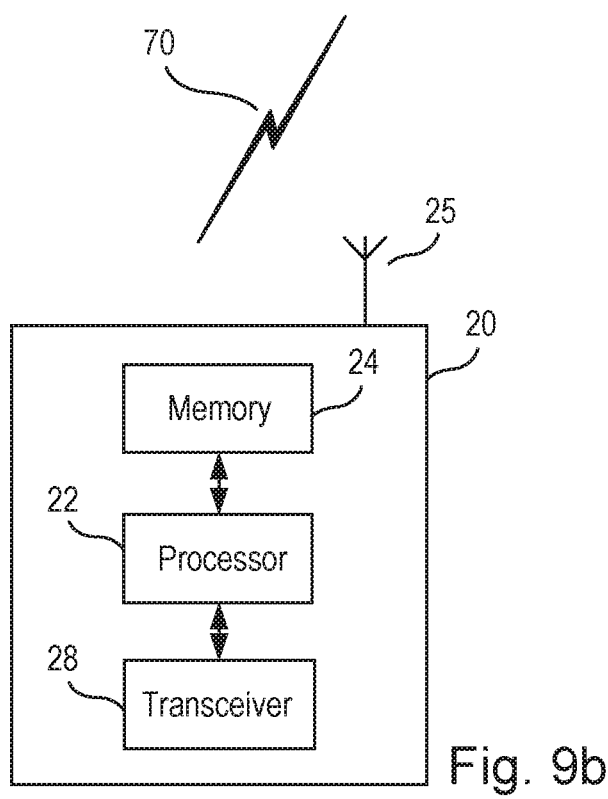
FIG. 9b illustrates an example block diagram of an apparatus, according to an embodiment.

FIG. 9b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 5-7 or 8b. In certain embodiments, apparatus 20 may include or represent a UE and may be configured to perform a procedure for CLI SRS RSRP measurement conditions reporting, for instance.

According to one embodiment, apparatus 20 may be controlled by memory 24 and processor 22 to provide, to a serving network node, capability information indicating at least the capability of the apparatus 20 to search for SRS timing. In some embodiments, apparatus 20 may be controlled to provide the capability information to indicate the capability of apparatus 20 to obtain and report a time aligned clean SRS measurement result. According to certain embodiments, the capability information may also include one or more of a search capable flag, search boundaries, or an indication of whether the CLI SRS RSRP measurement is valid or not valid. In some embodiments, the search capable flag may include an indication that the apparatus 20 is able to adjust for a timing error within a certain timing error limit when performing the CLI SRS RSRP measurement, and/or an indication that the apparatus 20 is able to adjust the timing error to a certain range within which a corresponding CLI SRS RSRP measurement accuracy is applied.

In an embodiment, apparatus 20 may be controlled by memory 24 and processor 22 to receive SRS configuration in a measurement request from the serving network node, such as a CLI SRS RSRP measurement request. According to some embodiments, the measurement request may include one or more of: a single SRS RSRP measurement at a specified timing offset, multiple SRS RSRP measurements at specified timing offsets, a single SRS RSRP measurement at a specified timing offset with search enabled, a single SRS RSRP measurement with timing of the measurement determined by apparatus 20, and/or a single SRS RSRP measurement with search override and timing of the measurement determined by apparatus 20.

In some embodiments, apparatus 20 may be controlled by memory 24 and processor 22 to perform one or more SRS RSRP measurement(s) as specified in the received SRS configuration. According to an embodiment, apparatus 20 may be controlled by memory 24 and processor 22 to report, to the serving network node, CLI SRS RSRP measurement results including at least one or more timing offsets used by the apparatus 20. In some embodiments, apparatus 20 may be controlled by memory 24 and processor 22 to report one or more of: a single measurement result and used timing offset, multiple measurement results and used timing offsets, two measurement results at specified timing offset and at search offset plus search verdict and accuracy assessment, a single measurement result and used timing offset plus an indication if search was used or not and search verdict, a single measurement result and used timing offset, a measured CLI SRS RSRP value, and/or a measured CLI SRS RSRP value and accuracy or validity verdict.

Therefore, certain example embodiments provide several technological improvements, enhancements, and/or advantages over existing technological processes and constitute an improvement at least to the technological field of wireless network control and management. For example, one advantage of the example embodiments of CLI SRS RSRP measurement procedures is a significantly increased information level at the gNB side, which is responsible for making qualified CLI mitigation decisions based on UE reported CLI SRS RSRP measurements. According to certain embodiments, the UE may inform the gNB about its ability to search for the timing of the SRS signal to measure on for optimum accuracy of the measurement. The gNB may obtain information about timing offset used for reported RSRP results which enables the gNB to evaluate the accuracy of the reported measurements and thus what weight to put on the measured values in context of CLI mitigation. This is useful information for the network to more effectively coordinate TDD operation, including scheduling and inter-gNB coordination of UL/DL switching patterns (aka radio frame configurations). The gNB may take control and request CLI SRS measurements at specified time offsets which enables the gNB to obtain RSRP measurement results aligned with UE DL timing (the actual DL interference scenario), or at any other offset(s) aligned with gNB known timing of the SRS arrival or as part of a search for SRS time of arrival for UE's without search capability. A timing search enabled UE may report an accuracy measure for measurement at another fixed time offset measurement which may be used to speed up measurements by subsequently selecting appropriate fixed offset over search enabled measurements. As a result, example embodiments may at least improve throughput, latency, and/or processing speed of network nodes and/or UEs. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:
   providing, by a user equipment to a serving network node, capability information indicating at least the user equipment's capability to search for sounding reference signal timing;
   receiving sounding reference signal configuration in a measurement request from the serving network node;
   performing, by the user equipment, at least one sounding reference signal reference signal received power measurement as specified in the sounding reference signal configuration; and
   reporting, to the serving network node, cross link interference sounding reference signal reference signal received power measurement results;
   wherein the capability information comprises at least one of a search capable flag, search boundaries, or an indication of whether the cross link interference sounding reference signal reference signal received power measurement is valid or not valid.

2. The method according to claim 1, wherein the measurement results comprise at least one or more timing offsets used by the user equipment.

3. The method according to claim 1, wherein the search capable flag further comprises at least one of:
   an indication that the user equipment is able to adjust for a timing error within a certain timing error limit when performing the cross link interference sounding reference signal reference signal received power measurement; or
   an indication that the user equipment is able to adjust the timing error to a certain range within which a corresponding cross link interference sounding reference signal reference signal received power measurement accuracy is applied.

4. The method according to claim 1, wherein the measurement request comprises a cross link interference sounding reference signal reference signal received power measurement request for the user equipment to perform at least one of:
   a single sounding reference signal reference signal received power measurement at a specified timing offset;
   multiple sounding reference signal reference signal received power measurements at specified timing offsets;
   a single sounding reference signal reference signal received power measurement at a specified timing offset with search enabled;
   a single sounding reference signal reference signal received power measurement with timing of the measurement up to user equipment implementation; or
   a single sounding reference signal reference signal received power measurement with search override and timing of the measurement up to user equipment implementation.

5. The method according to claim 4, wherein the reporting comprises reporting at least one of:
   a single measurement result and used timing offset;
   multiple measurement results and used timing offsets;
   two measurement results at specified timing offset and at search offset plus search verdict and accuracy assessment;
   single measurement result and used timing offset plus indication if search was used or not and search verdict;
   measured cross link interference sounding reference signal reference signal received power value; or
   measured cross link interference sounding reference signal reference signal received power value and accuracy or validity verdict.

6. The method according to claim 1, wherein the user equipment is a victim user equipment experiencing cross link interference from an aggressor user equipment transmitting on same resources.

7. An apparatus, comprising:
   at least one processor; and
   at least one memory comprising computer program code,
   the at least one memory and computer program code configured, with the at least one processor, to cause the apparatus at least to
   provide, to a serving network node, capability information indicating at least a capability of the apparatus to search for sounding reference signal timing;
   receive sounding reference signal configuration in a measurement request from the serving network node;
   perform at least one sounding reference signal reference signal received power measurement as specified in the sounding reference signal configuration; and
   report, to the serving network node, cross link interference sounding reference signal reference signal received power measurement results;

wherein the capability information comprises at least one of a search capable flag, search boundaries, or an indication of whether the cross link interference sounding reference signal reference signal received power measurement is valid or not valid.

8. The apparatus according to claim 7, wherein the measurement results comprise at least one or more timing offsets used by the apparatus.

9. The apparatus according to claim 7, wherein the search capable flag further comprises at least one of:
   an indication that the apparatus is able to adjust for a timing error within a certain timing error limit when performing the cross link interference sounding reference signal reference signal received power measurement; or
   an indication that the apparatus is able to adjust the timing error to a certain range within which a corresponding cross link interference sounding reference signal reference signal received power measurement accuracy is applied.

10. The apparatus according to claim 8, wherein the measurement request comprises a cross link interference sounding reference signal reference signal received power measurement request for the apparatus to perform at least one of:
   a single sounding reference signal reference signal received power measurement at a specified timing offset;
   multiple sounding reference signal reference signal received power measurements at specified timing offsets;
   a single sounding reference signal reference signal received power measurement at a specified timing offset with search enabled;
   a single sounding reference signal reference signal received power measurement with timing of the measurement determined by the apparatus; or
   a single sounding reference signal reference signal received power measurement with search override and timing of the measurement determined by the apparatus.

11. The apparatus according to claim 8, wherein the at least one memory and computer program code configured, with the at least one processor, to cause the apparatus at least to report at least one of:
   a single measurement result and used timing offset;
   multiple measurement results and used timing offsets;
   two measurement results at specified timing offset and at search offset plus search verdict and accuracy assessment;
   single measurement result and used timing offset plus indication if search was used or not and search verdict;
   measured cross link interference sounding reference signal reference signal received power value; or
   measured cross link interference sounding reference signal reference signal received power value and accuracy or validity verdict.

12. The apparatus according to claim 7, wherein the apparatus is a victim user equipment experiencing cross link interference from an aggressor user equipment transmitting on same resources.

13. An apparatus, comprising:
   at least one processor; and
   at least one memory comprising computer program code, the at least one memory and computer program code configured, with the at least one processor, to cause the apparatus at least to
   receive capability information indicating at least a capability of a user equipment to search for sounding reference signal timing;
   obtain, from a neighbour network node, a sounding reference signal configuration for candidate aggressor user equipment;
   transmit, to the user equipment, the sounding reference signal configuration in a measurement request;
   receive cross link interference sounding reference signal reference signal received power measurement results; and
   process the measurement results for use in cross link interference mitigation planning;
   wherein the capability information comprises at least one of a search capable flag, search boundaries, or an indication of whether the cross link interference sounding reference signal reference signal received power measurement is valid or not valid.

14. The apparatus according to claim 13, wherein the measurement results comprise at least one or more timing offsets used by the user equipment.

15. The apparatus according to claim 13, wherein the search capable flag further comprises at least one of:
   an indication that the user equipment is able to adjust for a timing error within a certain timing error limit when performing the cross link interference sounding reference signal reference signal received power measurement; or
   an indication that the user equipment is able to adjust the timing error to a certain range within which a corresponding cross link interference sounding reference signal reference signal received power measurement accuracy is applied.

16. The apparatus according to claim 13, wherein the measurement request comprises a cross link interference sounding reference signal reference signal received power measurement request for the user equipment to perform at least one of:
   a single sounding reference signal reference signal received power measurement at a specified timing offset;
   multiple sounding reference signal reference signal received power measurements at specified timing offsets;
   a single sounding reference signal reference signal received power measurement at a specified timing offset with search enabled;
   a single sounding reference signal reference signal received power measurement with timing of the measurement up to user equipment implementation; or
   a single sounding reference signal reference signal received power measurement with search override and timing of the measurement up to user equipment implementation.

17. The apparatus according to claim 13, wherein the at least one memory and computer program code are configured, with the at least one processor, to cause the apparatus at least to receive at least one of:
   a single measurement result and used timing offset;
   multiple measurement results and used timing offsets;
   two measurement results at specified timing offset and at search offset plus search verdict and accuracy assessment;
   single measurement result and used timing offset plus indication if search was used or not and search verdict;
   measured cross link interference sounding reference signal reference signal received power value; or measured cross link interference sounding reference signal reference signal received power value and accuracy or validity verdict.

\* \* \* \* \*